(12) United States Patent  
Matsumoto et al.

(10) Patent No.: US 9,277,600 B2  
(45) Date of Patent: Mar. 1, 2016

(54) STATOR COIL HEATING APPARATUS AND STATOR COIL HEATING METHOD

(71) Applicant: TOYOTA JIDOSHA KABUSHIKI KAISHA, Toyota-shi (JP)

(72) Inventors: Keishi Matsumoto, Yao (JP); Hideaki Miyake, Nissin (JP); Hideaki Kimura, Okazaki (JP); Satoshi Koide, Okazaki (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 13/923,000

(22) Filed: Jun. 20, 2013

(65) Prior Publication Data

US 2014/0091084 A1    Apr. 3, 2014

Related U.S. Application Data

(62) Division of application No. 12/517,830, filed as application No. PCT/JP2008/050301 on Jan. 11, 2008, now abandoned.

(30) Foreign Application Priority Data

Jan. 12, 2007   (JP) .................................. 2007-005205

(51) Int. Cl.
*H05B 6/36*   (2006.01)
*H02K 15/12*  (2006.01)

(52) U.S. Cl.
CPC . *H05B 6/36* (2013.01); *H02K 15/12* (2013.01)

(58) Field of Classification Search
CPC .................................. H05B 6/36; H02K 15/12
USPC .................. 310/217, 156.14, 156.19, 156.28; 219/83, 121.72, 129, 85.18, 85.22, 219/121.64, 121.14, 121.13, 121.63, 674
See application file for complete search history.

(56) References Cited

U.S. PATENT DOCUMENTS 3,495,113 A * 2/1970 Haydon ........................ 310/164
4,245,179 A * 1/1981 Buhrer .......................... 315/248

(Continued)

FOREIGN PATENT DOCUMENTS

EP       1 677 408        7/2006
JP       S49-014901       2/1974

(Continued)

OTHER PUBLICATIONS

International Search Report (PCT/ISA/210) dated Feb. 25, 2008.

(Continued)

*Primary Examiner* — Tu B Hoang
*Assistant Examiner* — Phuong Nguyen
(74) *Attorney, Agent, or Firm* — Buchanan Ingersoll & Rooney PC

(57) ABSTRACT

A stator coil heating apparatus and a stator coil heating method that are capable of effectively preventing a core from thermal deformation particularly caused due to a magnetic flux generated by a coil head, without the problem of heating temperature variation, and also shortening a time for the process of heating a stator coil, are provided.

A stator coil heating apparatus A to heat a stator coil L wound around a circular core F, comprises: induction heating coil heads 1 and 11 that heat the circular coil L by generating an inductive effect acting from outside in the thickness direction of the core F, against circular winding coil bases La and Lb that are sticking out of end faces Fa and Fb of the core F in the thickness direction thereof; and shields 2 and 12 that block a magnetic flux generated by the coil heads 1 and 11, out of the end faces Fa and Fb of the core F in the thickness direction thereof.

12 Claims, 13 Drawing Sheets

(56) References Cited

U.S. PATENT DOCUMENTS

2006/0138894 A1* 6/2006 Harada et al. .............. 310/217
2008/0084127 A1 4/2008 Sekine et al.

FOREIGN PATENT DOCUMENTS

| | | |
|---|---|---|
| JP | 60-82050 | 5/1985 |
| JP | 05-083904 | 4/1993 |
| JP | H06-121480 | 4/1994 |
| JP | 07-022168 | 1/1995 |
| JP | 2006-187174 | 7/2006 |
| JP | 2007-97238 | 4/2007 |
| WO | WO 2005/097400 | 10/2005 |

OTHER PUBLICATIONS

Written Opinion (PCT/ISA/237) dated Feb. 25, 2008.
European Search Report issued on Oct. 21, 2010 by the European Patent Office in corresponding European Patent Application No. 08703165, and English translation thereof.
Notification of Reasons for Refusal issued on Nov. 16, 2010 by the Japanese Patent Office in related Japanese Patent Application No. 2006-297010, and English translation thereof.
Notification of Reasons for Refusal issued on Mar. 15, 2011 by the Japanese Patent Office in corresponding Japanese Patent Application No. 2007-005205, and English translation thereof.
Zinn, S. and Semiatin, S.L., "Elements of Induction Heating Design, Control, and Applications", Electric Power Research Institute, Inc., Dec. 1987, pp. 241-252, ISBN 0-87170-308-4.

* cited by examiner (A)

(B)

(C)

(D)

STATOR COIL HEATING APPARATUS AND STATOR COIL HEATING METHOD

This application is a divisional of U.S. application Ser. No. 12/517,830 having a filing date of Jun. 5, 2009 which is a U.S. national state application based on International Application Publication No. PCT/JP2008/050301 filed on Jan. 1, 2008 and which claims priority of JP 2007-005205 filed in Japan on Jan. 12, 2007, the entire content of all three of which is incorporated herein by reference.

FIELD OF THE INVENTION

The present invention relates to a stator coil heating apparatus and a stator coil heating method that are used in the manufacturing process of a stator such as an automotive electrical generator.

BACKGROUND OF THE ART

As generally practiced, in the manufacturing process of a stator that is an automotive electrical generator, a three-phase stator coil is wound around a circular core, and after that, the entire stator coil including a circular winding coil base that is sticking out of an end face of the core in the axial direction thereof, is impregnated with varnish. In this state of things, the stator coil is heated, and thereby the impregnating varnish is harden-dried.

After impregnating the stator coil with varnish, it is conventionally practiced that the entire stator is inserted into a heating furnace while being rotated, and thereby the impregnating varnish is harden-dried with heated air.

However, in the method of harden-drying varnish by using a heating furnace, a temperature of the stator is increased in a slow manner after the stator is inserted into a heating furnace. Therefore, in order to satisfy enough thermal and temporal conditions to harden varnish material, a longer heating time is required and more electrical energy is consumed, which causes high costs. Furthermore, in order to keep a constant temperature in a heating furnace, a temperature in a heating furnace is required to be increased before inserting a workpiece therein and is required to be kept all the while until entirely discharging a workpiece therefrom, which makes costs still higher.

Meanwhile, in the process of preheating the stator coil before impregnating the stator coil with varnish it is conventionally suggested for the purpose of improving operating efficiency and also saving electrical energy by reduction of a heating time, that a high-frequency induction heating coil head is positioned in the central opening of the circular core, then the stator coil and the core are heated rapidly by the high-frequency induction heating method.

A heating means using this above-mentioned high-frequency induction heating coil head is probatively introduced to the process of harden-drying varnish impregnating the stator coil. Concretely, a high-frequency induction heating coil head is set from outside in the thickness direction of the core of the stator, against the winding coil base that is sticking out of each of the end faces of the core in the thickness direction (the axial direction) thereof, and then the stator coil is heated with high-frequency induction heat applied by the high-frequency induction heating coil head.

Furthermore, it is conventionally suggested that the stator coil is energized to cause self-heating, and thus the stator coil is heated (as referred to Patent Document 1: Japanese Unexamined Laid-open Patent Publication No. S60-82050, for example). However, in the case of heating the stator coil by employing the induction heating method, a part of a magnetic flux generated by an induction heating coil head acts on the end faces of the core in the thickness direction thereof. Since a core is usually constructed of layered silicon steel plates and the thermal conductivity in the thickness direction of such a core is low, only the end faces of the core in the thickness direction thereof are particularly heated, and the end faces of the core in the thickness direction thereof could be thermally deformed. And accordingly, the stator coil could not be heated favorably, which leaves a problem.

As for the method of energizing the stator coil to cause self-heating, there is a tendency that a self-heating temperature is varied depending on a type of the stator coil. Therefore, this method is not an easy choice and leaves a problem.

On the other hand, in the manufacturing process of a stator such as an automotive electrical generator, a stator coil wound around the inner circumference of a circular core is sometimes impregnated with varnish or plastic-molded. In these cases, it is necessary to heat the stator coil and the core before varnish impregnation or plastic-mold processing.

Conventionally, the entire stator coil is heated in a hot-air heating furnace before varnish impregnation or plastic-mold processing.

However, in the conventional method above, since the stator coil is heated from its surface in a slow manner, a longer heating time is required. Accordingly, more electrical energy is consumed.

And even trying to heat the stator coil and the core uniformly and evenly, a long heating time is required and keeping the stator coil at a predetermined temperature is not easy. As results, varnish applied to the stator coil could not be impregnated well and the molding could lose its quality because a crack or etc. could be caused, which leaves a problem.

To cope therewith, it is suggested for the purpose of improving temperature variation in the stator, saving electrical energy by reduction of a heating time, and etc., that a high-frequency induction heating coil head is positioned in the central opening of the circular core, and thereby the stator coil and the core are heated rapidly by the high-frequency induction heating method.

And also, as described in Patent Document 1 above, it is also suggested that the stator coil is heated more uniformly by energization to cause self-heating in addition to the high-frequency induction heating method.

However, in the method of positioning a high-frequency induction heating coil head in the central opening of the circular core and heating the stator coil and the core by the high-frequency induction heating method, a large part of a magnetic flux generated by the high-frequency induction heating coil head acts on the outer circumference areas of the end faces of the core in the thickness direction thereof. Since a core is usually constructed of layered silicon steel plates and the thermal conductivity in the thickness direction of such a core is low, only these parts are particularly heated and thereby thermal deformation could be caused and its insulating resin could be damaged, and thus the stator coil could not be heated favorably, which leaves a problem.

And in the method of heating the stator coil and the core by energization to cause self-heating in addition to the high-frequency induction heating method, a self-heating temperature is varied depending on a type of the stator coil, and the entire stator coil could be vibrated by an electromagnetic force generated when the stator coil is energized, which leaves a problem. Furthermore, it is troublesome to determine a position of an energization terminal and automation is not easy, and sparks could be occurred between connection terminals due to poorly fitting contacts when the stator coil and a power source for energization are connected, which leaves a problem.

Problems to be Resolved by the Invention

The present invention is developed to cope with the current circumstances described above, and it is an objective of the present invention to provide a stator coil heating apparatus and a stator coil heating method that are capable of effectively preventing a core from thermal deformation particularly caused due to a magnetic flux generated by a coil head, without the problem of heating temperature variation, and also shortening a time for the process of heating a stator coil.

It is another objective of the present invention to provide a stator coil heating apparatus and a stator coil heating method that are capable of uniformly heating a stator coil and a core and also preventing temperature elevation caused by particularly heating the core, by the high-frequency induction heating method without the need for energizing the stator coil.

Means of Solving the Problems

The objectives described above will be achieved by the following means.
(1) A stator coil heating apparatus to heat a stator coil wound around a circular core, comprising:
    an induction heating coil head that heats the circular coil by generating an inductive effect acting from outside in the thickness direction of the core, against a circular winding coil base that is sticking out of an end face of the core in the thickness direction thereof; and
    a shield that blocks a magnetic flux generated by the coil head, out of an end face of the core in the thickness direction thereof.
(2) The stator coil heating apparatus recited in (1), wherein:
    the shield is provided to the induction heating coil head, in a unified manner.
(3) The stator coil heating apparatus recited in (1) or (2), wherein:
    the coil head is looped in one plain or cylindrically, at approximately the same diameter as that of the circular winding coil base, and is positioned coaxially with the core, outside of the core in the thickness direction thereof, against each of the sides of the winding coil base in the thickness direction of the core; and
    the shield is a circular one that blocks a magnetic flux generated by the coil head, out of the outer circumference area of an end face of the core in the thickness direction thereof.
(4) The stator coil heating apparatus recited in (1) or (2), wherein:
    the coil head is looped in one plain or cylindrically, and the coil head is positioned in an arbitrary location in the circumferential direction, from outside in the thickness direction of the core, against the winding coil base on each of the end faces of the core in the thickness direction thereof;
    the shield is an arch-shaped one that blocks a magnetic flux generated by the coil head, out of the outer circumference area of an end face of the core in the thickness direction thereof; and
    the stator rotates about its axis when the stator coil is inductively heated.
(5) A stator coil heating method to inductively heat a stator coil wound around a circular core, by an inductive heating coil head, comprising:
    heating the circular coil, by generating an inductive effect that acts from outside in the thickness direction of the core, against a circular winding coil base that is sticking out of an end face of the core in the thickness direction thereof, while blocking by a shield, a magnetic flux that is generated by the coil head and acts on an end face of the core in the thickness direction thereof.
(6) A stator coil heating apparatus comprising:
    a high-frequency induction heating portion that heats a stator coil and a circular core having the stator coil wound around the inner circumference of the circular core itself, by a high-frequency induction heating coil head provided in the central opening of the core, and wherein:
    the high-frequency induction heating portion is positioned coaxially with the core, outside of the core, against each of the end faces of the core in the thickness direction thereof, and
    further comprising:
    a shield that blocks a magnetic flux generated by the coil head, out of the outer circumference area of the core in the thickness direction thereof.
(7) The stator coil heating apparatus recited in (6), wherein:
    the shield is cylindrical or doughnut-shaped.
(8) The stator coil heating apparatus recited in (6) or (7), wherein:
    the shield is positioned in the vicinity of the outer end of the stator coil in the radial direction of the core.
(9) The stator coil heating apparatus recited in (6), (7) or (8), wherein:
    the high-frequency induction heating coil head has a looped portion that is positioned in the vicinity of the stator coil, against one or both of the end faces of the core in the thickness direction thereof.
(10) The stator coil heating apparatus recited in (6), (7), (8) or (9), wherein:
    the high-frequency induction heating coil head is positioned in the middle region of the core in the thickness direction thereof, circumferentially around the core.
(11) A stator coil heating method to heat with high-frequency induction heat, a stator coil wound around the inner circumference of a circular core, by inserting a high-frequency induction heating coil head into the central opening of the circular core, comprising:
    positioning a shield that blocks a magnetic flux generated by the high-frequency induction heating coil head, out of the outer circumference area of the core, coaxially with the core, outside against each of the end faces of the core in the thickness direction thereof, and then heating the stator coil and the core by applying an alternating-current voltage to the coil head.
(12) The stator coil heating method recited in (11), wherein:
    the shield is cylindrical or doughnut-shaped.
(13) The stator coil heating method recited in (11) or (12), wherein:
    the shield is positioned in the vicinity of the outer end of the stator coil in the radial direction of the core.
(14) The stator coil heating method recited in (11), (12) or (13), wherein:
    the high-frequency induction heating coil head has a looped portion that is positioned in the vicinity of the stator coil, against one or both of the end faces of the core in the thickness direction thereof.
(15) The stator coil heating method recited in (11), (12), (13) or (14), wherein:
    positioning the high-frequency induction heating coil head, in the middle region of the core in the thickness direction thereof, circumferentially around the core, and then heating the stator coil with high-frequency induction heat.

Advantageous Effects of the Invention

According to the invention recited in the item (1), a stator coil is heated by using an induction heating coil head, not by using a hot-air heating furnace. Therefore, a heating time for the process of heating and harden-drying after impregnating a coil with varnish, for example, can be reduced. Furthermore, the inconvenience occurring in the case of harden-drying by a hot-air heating method using a heating furnace, which is the high cost caused due to a longer heating time and more electrical energy consumption, and also environmental inconveniences, are eliminated.

Furthermore, the inconvenience occurring in the method of energizing the stator coil, which is self-heating temperature variation, is eliminated. And thus, a favorable heating process is enabled.

Particularly, an end face of a core in the thickness direction thereof is shielded by a shield from a magnetic flux generated by the induction heating coil head. Therefore, the risk that an end face of the core is particularly heated and thermally deformed is eliminated. Furthermore, a large part of a magnetic flux acts on the stator coil accordingly, and the stator coil is efficiently heated and varnish or etc. can be harden-dried rapidly.

According to the invention recited in the item (2), the shield is provided to the induction heating coil head, in a unified manner. Therefore, the shield can be set at the same time as loading the induction heating coil head, which would contribute to promptness of preparation for heating.

According to the invention recited in the item (3), the induction heating coil head which diameter is approximately the same as that of the circular winding coil base that is sticking out of each of the end faces of the core in the thickness direction thereof, is used. Therefore, the whole circumference of the winding coil base can be heated at the same time by a magnetic flux generated by the induction coil head, without moving the stator.

Furthermore, the outer circumference area of an end face of the core in the thickness direction thereof is shielded by the circular shield. Therefore, each of the end faces can be effectively prevented from being thermally deformed.

According to the invention recited in the item (4), the induction heating coil head is positioned against the winding coil base, in an arbitrary location in the circumferential direction thereof, and then the stator coil is rotated about its axis and inductively heated. And thus, an induction heating process can be easily performed without using a coil head which diameter is the same as that of the winding coil base.

According to the invention recited in the item (5), the stator coil is heated by using the inductive heating coil head, not by using a heating furnace. Therefore, the process of heating and harden-drying after impregnating the coil with varnish, for example, can be efficiently performed in a short time.

According to the invention recited in the item (6), a shield that blocks a magnetic flux generated by a high-frequency induction heating coil head, out of the outer circumference area of a circular core, is positioned coaxially with the core, outside on each of the end faces of the core in the thickness direction thereof. Therefore, a magnetic flux generated by the high-frequency induction heating coil head is prevented from acting on the outer circumference area of the core, and heat is applied mainly from the inner circumference thereof, and meanwhile, a large part of the high-frequency magnetic flux goes through a stator coil and the stator coil is heated favorably. Thus, the stator coil and the core can be heated uniformly, at the same time, the inconveniences: thermal deformation and damage on insulating plastic, which may be brought by particularly heating only the outer circumference area of an end face of the core in the thickness direction thereof, can be eliminated. Furthermore, since the stator coil is not energized, the inconveniences: heating temperature variation in the stator coil, which is caused by energization; vibration of the stator coil; troubles in determining a position of a terminal in the case of energization; and occurrence of sparks due to poorly fitting contacts when connecting for energization, never arise.

According to the invention recited in the item (7), a magnetic flux generated by the high-frequency induction heating coil head can be effectively blocked out of the outer circumference area of the core, by the cylindrical or doughnut-shaped shield.

According to the invention recited in the item (8), the shield is positioned in the vicinity of the outer end of the stator coil in the radial direction of the core. Therefore, a magnetic flux generated by the coil head can be more surely blocked out of the outer circumference area of the core, and the core can be more evenly heated from its inner circumference due to thermal conduction from one to another layer thereof.

According to the invention recited in the item (9), the high-frequency induction heating coil head has a looped portion that is positioned in the vicinity of the stator coil, against one or both end faces of the core in the thickness direction thereof. Therefore, a high-frequency magnetic flux generated by the coil head, acting from each looped portion, goes through the stator coil more effectively, in comparison to the case in which the looped portion of the coil head is provided only in the middle region of the core in the thickness direction thereof. And thus, heat can be applied more efficiently.

According to the invention recited in the item (10), the high-frequency induction heating coil head is positioned in the middle region of the core in the thickness direction thereof, circumferentially around the core. Therefore, the stator coil and the core are inductively heated by this outside coil head, additionally. Consequently, in comparison to the case of heating only by an inside coil head, induction heating both from inside and outside requires a less heating time to increase a temperature of the core and the stator coil and less energy is required for heating, which would contribute to reduction of electrical energy.

According to the invention recited in the item (11), a shield is provided then high-frequency induction heat is applied. Therefore, a magnetic flux generated by a high-frequency induction heating coil head is blocked out of the outer circumference area of a core, and heat is applied mainly from the inner circumference thereof, and meanwhile, a large part of a high-frequency magnetic flux goes through a stator coil and the stator coil is heated favorably. Thus, the stator coil and the core can be heated uniformly, and the inconveniences: thermal deformation and damage on insulating plastic, which may occur to the outer circumference area of an end face of the core in the thickness direction thereof, can be eliminated at the same time.

According to the invention recited in the item (12), a magnetic flux generated by the high-frequency induction heating coil head can be effectively blocked out of the outer circumference area of the core, by the cylindrical or doughnut-shaped shield.

According to the invention recited in the item (13), the shield is positioned in the vicinity of the outer end of the stator coil in the radial direction of the core. Therefore, a magnetic flux generated by the high-frequency induction heating coil head can be more surely blocked out of the outer circumference area of the core.

According to the invention recited in the item (14), the high-frequency induction heating coil head has a looped portion positioned in the vicinity of the stator coil, against one or both of the end faces of the core in the thickness direction thereof. Therefore, a high-frequency magnetic flux generated by the coil head, acting from each looped portion, goes through the stator coil more effectively, in comparison to the case in which the looped portion of the coil head is positioned only in the middle region of the core in the thickness direction thereof. And thus, heat can be applied more efficiently.

According to the invention recited in the item (15), the high-frequency induction heating coil head is positioned in the middle region of the core in the thickness direction thereof, circumferentially around the core, and then high-frequency induction heat is applied. Therefore, the stator coil and the core are inductively heated by this outside coil head, additionally. As a result, in comparison to the case of heating only by an inside coil head, a less heating time is required to increase a temperature of the core and the stator coil and less energy is required for heating.

EXPLANATION OF THE CODES

1, 11 High-frequency Induction Heating Coil Head
2, 12 Shield
A, B High-frequency Induction Heating Apparatus
F Core of a Stator
Fa, Fb End Face of a Core in the Thickness Direction Thereof
L Stator Coil of a Stator
La, Lb Winding Coil Base of a Stator Coil
M Stator
30 High-frequency Induction Heating Apparatus
Varnish Application Means
330 Coil Head of a High-frequency Induction Heating Apparatus
330a, 330b Looped Portion of a Coil Head
360 Cylindrical Shield
F1 Core of a Stator
F1a Outer Circumference Area of a Core
L1 Stator Coil
M1 Stator
M1a Central Opening of a Stator

PREFERRED EMBODIMENTS TO IMPLEMENT THE INVENTION

Figure 1:
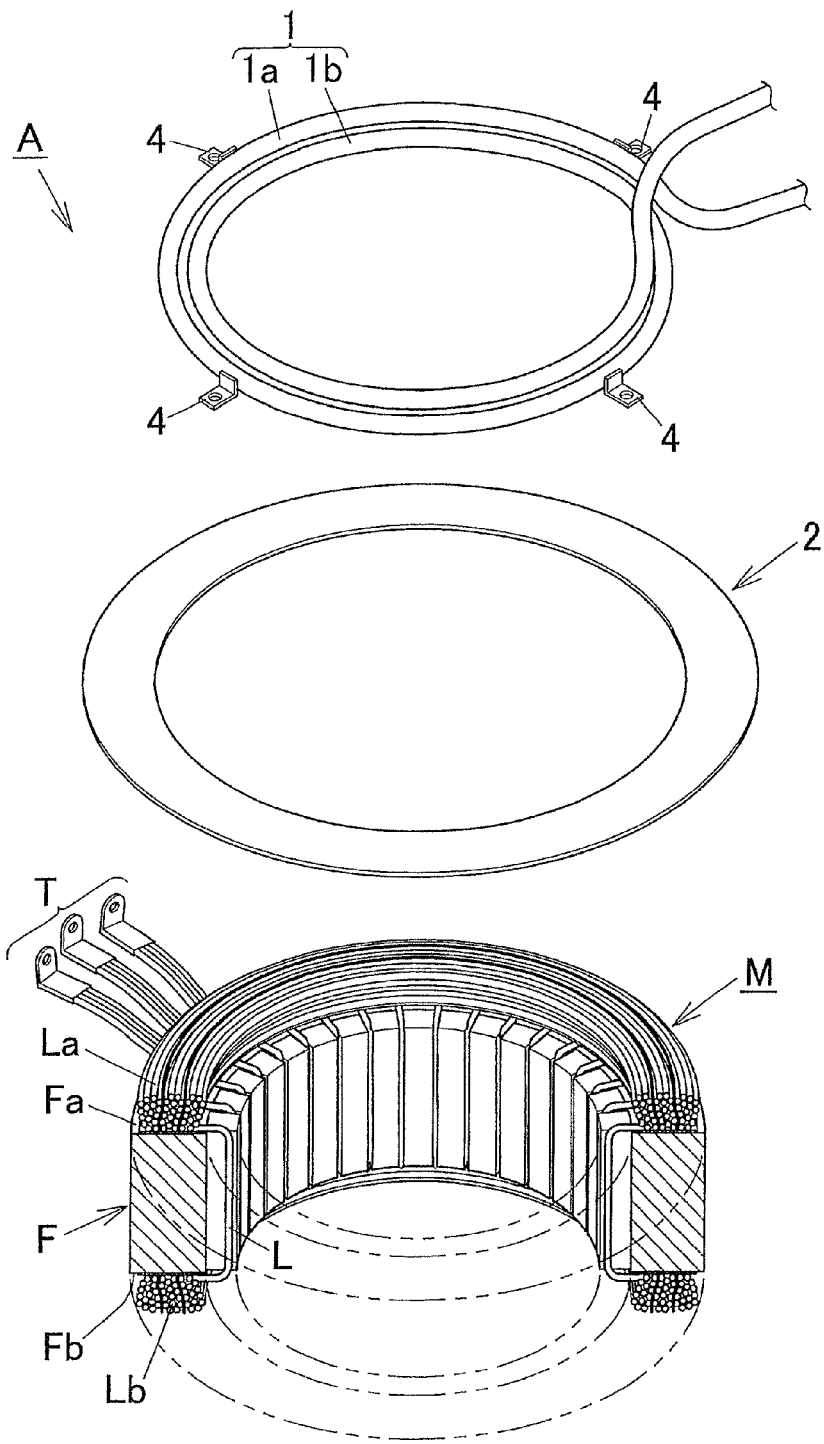
FIG. 1 This is an exploded perspective view showing a stator coil heating apparatus according to one embodiment of the present invention.
Figure 2:
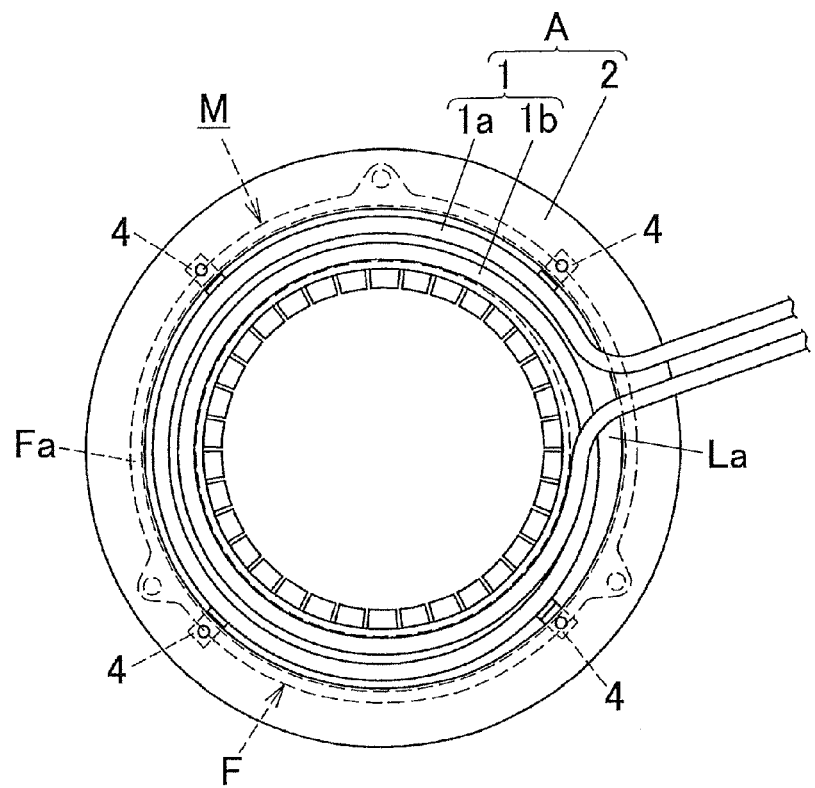
FIG. 2 This is a plain view showing the stator coil heating apparatus set on a stator.
Figure 3:
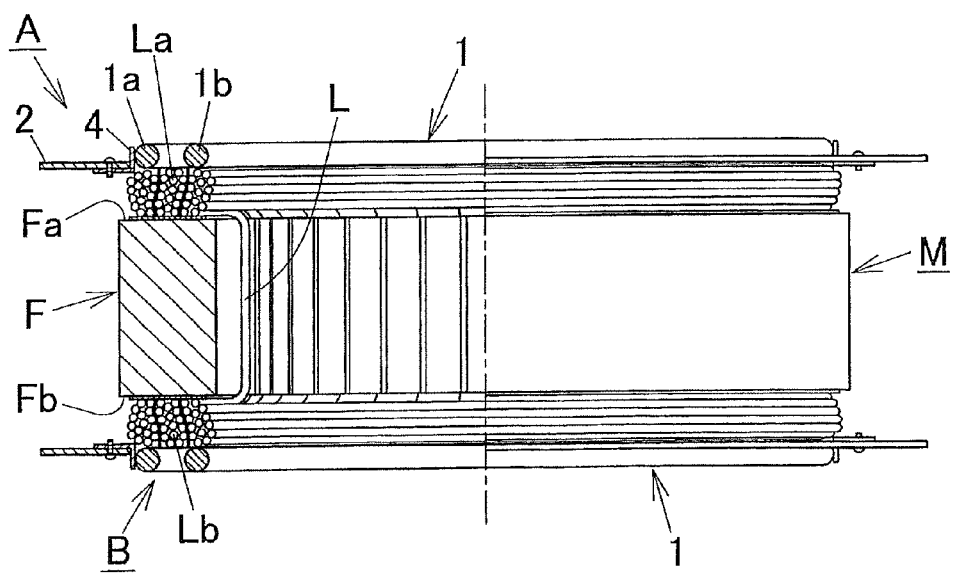
FIG. 3 This is a half cutaway view showing the stator coil heating apparatus set on a stator.

FIG. 1 is an exploded perspective view showing a stator coil heating apparatus according to an embodiment of the present invention, FIG. 2 is a plain view showing the same stator coil heating apparatus set on a stator, and FIG. 3 is a half cutaway view showing the same stator coil heating apparatus set on a stator.

This embodiment will be explained with the example of heating a stator coil of a stator that is an automotive electrical generator. However, it is not limited thereto.

As shown in FIG. 1 through FIG. 3, a stator M comprises a circular core F constructed of a plurality of thin silicon steel plates layered in the thickness direction and a three-phase stator coil L wound around the core F. And circular winding coil bases La and Lb are sticking out of the end faces Fa and Fb of the core F in the thickness direction (the axial direction: the vertical direction in Figure) thereof, respectively. The entire stator coil L including these winding coil bases La and Lb is varnish-applied and impregnated (not shown in Figure) in the pre-process or in the post-process.

T represents a three-phase external terminal drawn from the stator coil L.

In order to heat the stator coil L impregnated with varnish, stator coil heating apparatuses A and B are positioned against both of the end faces in the thickness direction thereof, respectively (only the heating apparatus A on one end face is shown in FIG. 1).

Hereinafter, the heating apparatus A on one end face (the upper end face) thereof, will be explained on behalf, since the heating apparatuses A and B have the same structure.

The heating apparatus A is structured as a high-frequency induction heating apparatus, and comprises a high-frequency induction heating coil head 1 driven by an output from a high-frequency oscillator not shown in Figure, and a shield 2.

The high-frequency induction heating apparatus A allows an operator to specify heating conditions such as a heating temperature, a heating time and etc., appropriate for a type of the stator M, via an operation panel not shown in Figure. And the specified heating conditions are recorded in a memory (not shown in Figure), as a heating chart.

And he/she calls a preferable heating chart by selecting and specifying a heating chart appropriate for a type of the stator M that is a heating target, and then the heating conditions of the stator coil L are implemented according to the heating chart, by computer control.

The high-frequency induction heating coil head 1 is looped some times (twice, for example) in one plain or cylindrically (in a circular cylinder, in this embodiment), at approximately the same diameter as that of the circular winding coil base La, and is positioned coaxially from outside in the thickness direction of the core F, against the winding coil base La.

Figure 4:
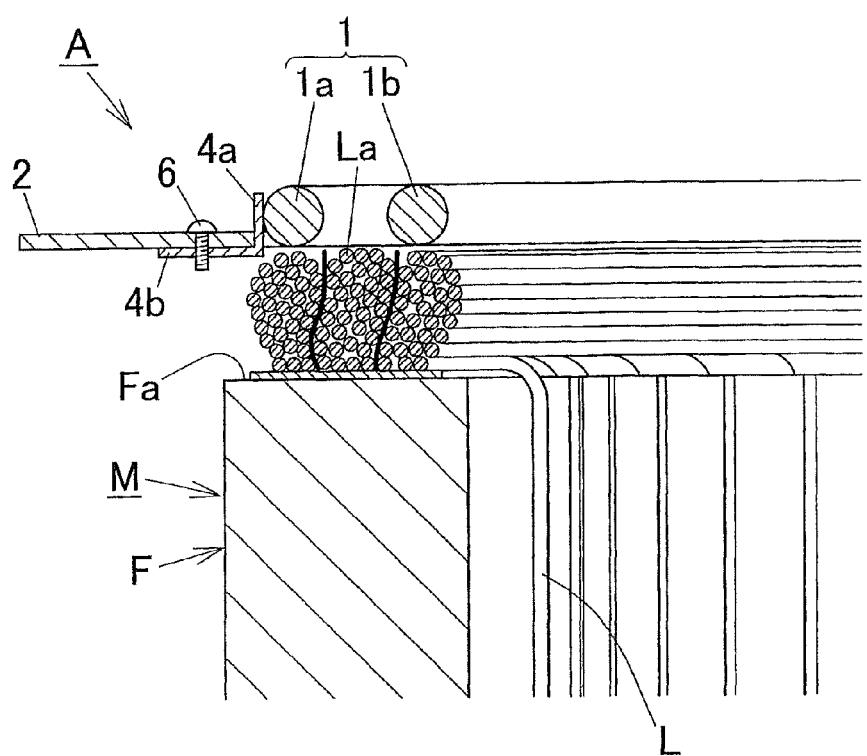
FIG. 4 This is an enlarged view showing a principal part of the stator coil heating apparatus with explanation of its operation.

On the outer circumferential surface of a circumferential loop is of this high-frequency induction heating coil head 1, a plurality of, for example, four L-shaped shield supporting brackets 4 . . . are provided at equal spaces in the circumferential direction, and a vertical part 4a of each of the shield supporting brackets 4 . . . is fixed by brazing (as referred to FIG. 4).

As for loading this high-frequency induction heating coil head 1, this may be conveyed manually by an operator, or may be conveyed automatically by a coil holding means prepared for exclusive use. These can be arbitrarily selected.

As for the time of turning the high-frequency induction heating coil head 1, it is not limited to a two-turn loop as exemplified here. The time of turning can be arbitrarily increased or reduced depending on a preferable coil heating temperature, processing speed, and etc.

The shield 2 blocks a high-frequency magnetic flux generated by the high-frequency induction heating coil head 1, out of the outer circumference area of the end face Fa (the upper end face) of the core F in the thickness direction thereof. It is made from a Cu plate for example, and is shaped into a brim at a diameter that is larger than that of the winding coil base La of the stator coil L in order not to be interfered by the winding coil base La. And it is positioned coaxially, from outside in the thickness direction of the core F, against the outer circumference area of the end face Fa thereof.

The shield 2 is connected and attached to the outer circumferential surface of the circumferential loop is of the heating coil head 1, by the four L-shaped shield supporting brackets 4 . . . , in the state of being electrically insulated from the coil head 1. Concretely, as shown in FIG. 4, the shield 2 is placed on a horizontal part 4b of each of the four L-shaped shield supporting brackets 4 . . . and fixed with plastic (vinyl) screws 6.

Meanwhile, a means to connect the shield 2 to the circumferential surface of the circumferential loop is of the high-frequency induction heating coil 1 is not limited to the structure exemplified here, and the shield 2 is not necessarily connected to the high-frequency induction heating coil 1. Any arbitrary means can be employed as long as its structure allows the shield 2 to be attached to the circumferential loop is of the high-frequency induction heating coil 1, in a unified manner.

Hereinafter, operations of the stator coil heating apparatus A having the above-mentioned structure, will be explained.

When the stator M having the stator coil L that is impregnated with varnish is conveyed and placed at a predetermined heating position, the high-frequency induction heating coil head 1 is set to a predetermined position, and meanwhile the shield 2 attached to the high-frequency induction heating coil head 1 in a unified manner is positioned against the outer circumference area of the end face Fa of the core F.

The shield 2 that is independent from the high-frequency induction heating coil head 1, may be held in a specified position by a holding means for exclusive use. Although, if the shield 2 is attached to the high-frequency induction heating coil head 1 in a unified manner as exemplified here, the shield 2 can be set at the same time as loading the high-frequency induction heating coil head 1, which would contribute to promptness of preparation for heating.

When the high-frequency oscillator of the high-frequency induction heating apparatus A is driven in this state of things, a high-frequency output is given to the high-frequency induction heating coil head 1. Then, high-frequency induction heat is applied to the stator coil L of the stator M due to a high-frequency magnetic flux generated by the coil head 1, and thus the stator coil L is heated, and thereby the varnish impregnating the stator coil L is harden-dried.

When the stator coil L is heated at a predetermined temperature with high-frequency induction heat applied by the high-frequency induction heating coil head 1, the high-frequency induction heating operation by the coil head 1 is resumed.

As described above, high-frequency induction heat is applied to the varnish-applied and impregnated stator coil L by using the high-frequency induction heating coil head 1, and thus the stator coil L is heated directly. Therefore, a long heating time is not required contrary to the case of heating by using a heating furnace, which would contribute to reduction of electrical energy.

Furthermore, the inconvenience occurring in the case of energizing the stator coil L to cause self-heating, which is self-heating temperature variation, is eliminated. And thus, the stator coil L is heated favorably.

On the other hand, if the winding coil base La of the stator coil L is heated by the high-frequency induction heating coil head 1 not having the shield 2 set thereto, a part of a high-frequency magnetic flux generated by the coil head 1 acts particularly on the outer circumference area of the end face Fa of the core F in the thickness direction thereof and the end face Fa is particularly heated, and could be thermally deformed.

To cope with this, in this embodiment of the present invention, the shield 2 is provided in each position against the outer circumference area of the end face Fa of the core F in the thickness direction thereof. Therefore, a high-frequency magnetic flux generated by the coil head 1, trying to act on the outer circumference area of the end face Fa of the core F, is blocked out. Accordingly, the outer circumference area of the area face Fa of the core F is prevented from being heated particularly, and this part is effectively prevented from being thermally deformed.

Furthermore, since the outer circumference area of the end face Fa of the core F is shielded from a high-frequency magnetic flux, a large part of the high-frequency magnetic flux generated by the high-frequency induction heating coil head 1 acts on the stator coil L. Thus, the stator coil is heated efficiently, which would contribute to reduction of a heating time.

Figure 5:
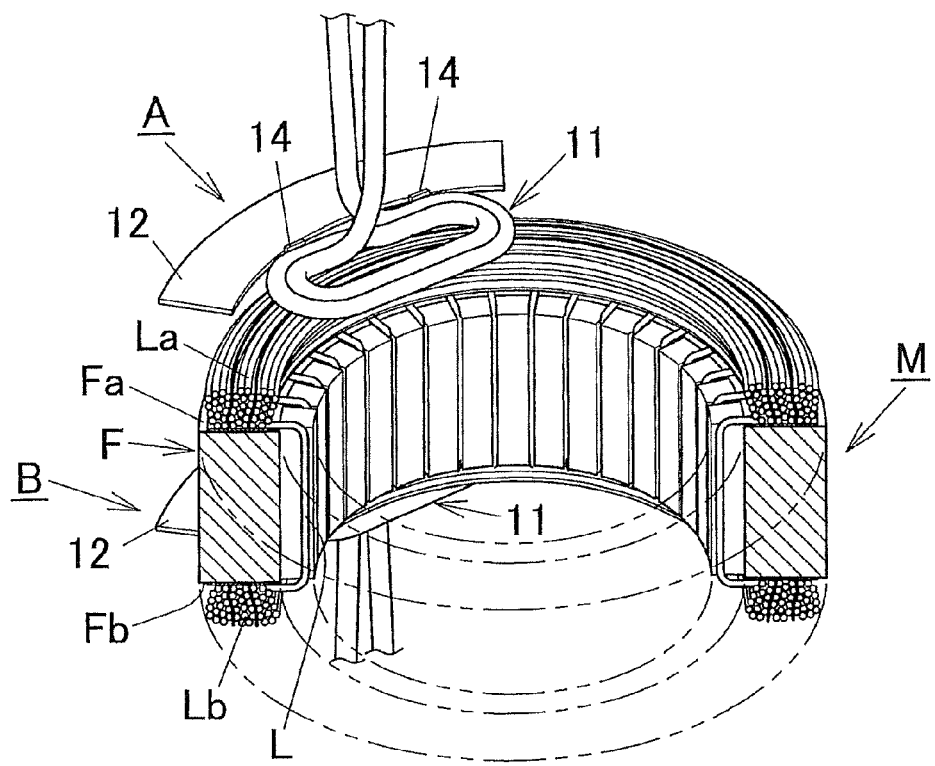
FIG. 5 This is a perspective view showing a stator coil heating apparatus according to another embodiment of the present invention, which is set on a stator.
Figure 6:
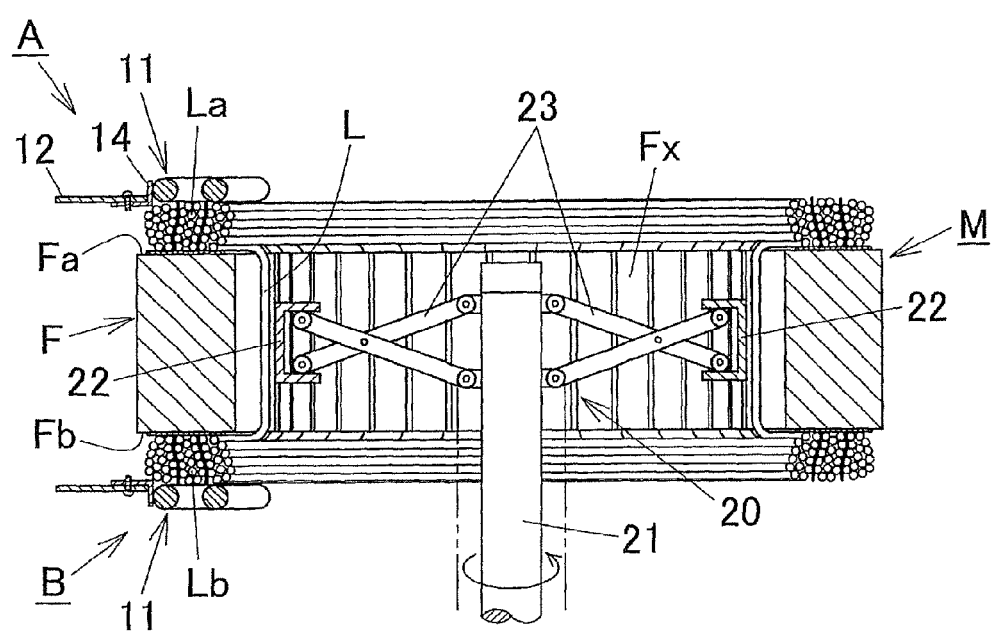
FIG. 6 This is a cutaway view showing a stator rotary driving mechanism of the stator coil heating apparatus according to another embodiment of the present invention.

FIG. 5 shows another embodiment of the present invention.

As shown in FIG. 5, the high-frequency induction heating apparatus A comprises a small high-frequency induction heating coil head 11. This high-frequency induction heating coil head 11 is positioned in an arbitrary location in the circumferential direction of the stator coil L, from outside in the thickness direction of the core F. Similarly, a high-frequency induction heating apparatus B having the same structure is provided on the other end face (the lower end face in FIG. 5) of the core F in the thickness direction thereof, and the high-frequency induction heating coil head 11 is positioned from outside in the thickness direction of the core F, although it is not shown in FIG. 5.

These high-frequency induction heating coil heads 11 are shaped in an arbitrary loop, and looped some times (twice, for example) in one plain or cylindrically (in a circular cylinder, for example).

Furthermore, an arch-shaped shield 13 is connected to the outer circumferential surface of the high-frequency coil heads 11, by the bracket 14.

The shield 12 is made from a Cu plate for example, and is shaped into an arc. And it shields the outer circumference area of the end face Fa of the core F in the thickness direction thereof, from a high-frequency magnetic flux generated by the high-frequency induction heating coil head 11.

Furthermore, this high-frequency induction heating apparatus A comprises a stator rotary driving mechanism 20 that is capable of chucking the stator M and letting it rotate about its axis.

This stator rotary driving mechanism 20 comprises a driving axis 21 that is driven by a rotary driving apparatus such as a motor not shown in Figure, in the state of being in a central opening Fx of the core F of the stator M, and a plurality of stator chuck members 23 that is provided at equal spaces around the driving axis 21 and in the end region of this driving axis 21, and have pushing portions 22 at the end.

This stator rotary driving mechanism 20 rotates the driving axis 21. With rotation, the stator chuck members 23 extends out in the radial direction and pushes the pushing portions 22 against the inner wall of the central opening Fx of the circular core F, and thus it rotates the stator M about its axis.

In this embodiment, in the case of applying high-frequency induction heat by the high-frequency induction heating coil head 11, the coil head 11 is positioned in an arbitrary location in the circumferential direction, against the winding coil base La of the stator coil L, then the stator M is rotated about its axis. And thereby the whole circumference of the winding coil base La of the stator coil L is heated.

In this case, since the stator M is rotated, the coil head 11 that is smaller than the circular coil head 1 mentioned in the prior embodiment can be used, and accordingly the shield 12 that is small and arc-shaped can be applicable.

In this embodiment explained above, the high-frequency induction heating method is employed. Alternatively, the low-frequency induction heating method using commercial power frequency and etc. for example, may be employed. Furthermore, in the example using the large-diameter heating coil head of FIG. 1 through FIG. 4, the coil L is heated without rotating the stator M. Alternatively, the coil L may be heated with rotating the stator M.

Furthermore, heat is applied when the axial direction (the thickness direction) of the stator M is vertically positioned. Or alternatively, heat may be applied when the axial direction of the stator M is horizontally positioned, and thus the position of the stator M can be arbitrarily specified. In this case, an induction heating coil head can be positioned not under the stator, and thus, even if low-viscosity varnish material or etc. before being hardened happens to drop off the coil end or a slot, it would not stick to the induction heating coil head, which would contribute to ease of maintenance.

Furthermore, the shield 2 and 12 are positioned so as to shield only the outer circumference areas of the end faces of the circular core F in the thickness direction thereof. As necessary, these may also shield the inner circumference area thereof. However, since the outer circumference areas of the end faces of the circular core F in the thickness direction thereof are exposed more broadly and coils are wound around the inner circumferences, it is generally preferred to let a magnetic flux act also on the wound coils and apply inductive heat thereto. Therefore, like in this embodiment, it is better to shield only the outer circumference areas of the end faces of the circular core F in the thickness direction thereof.

Figure 7:
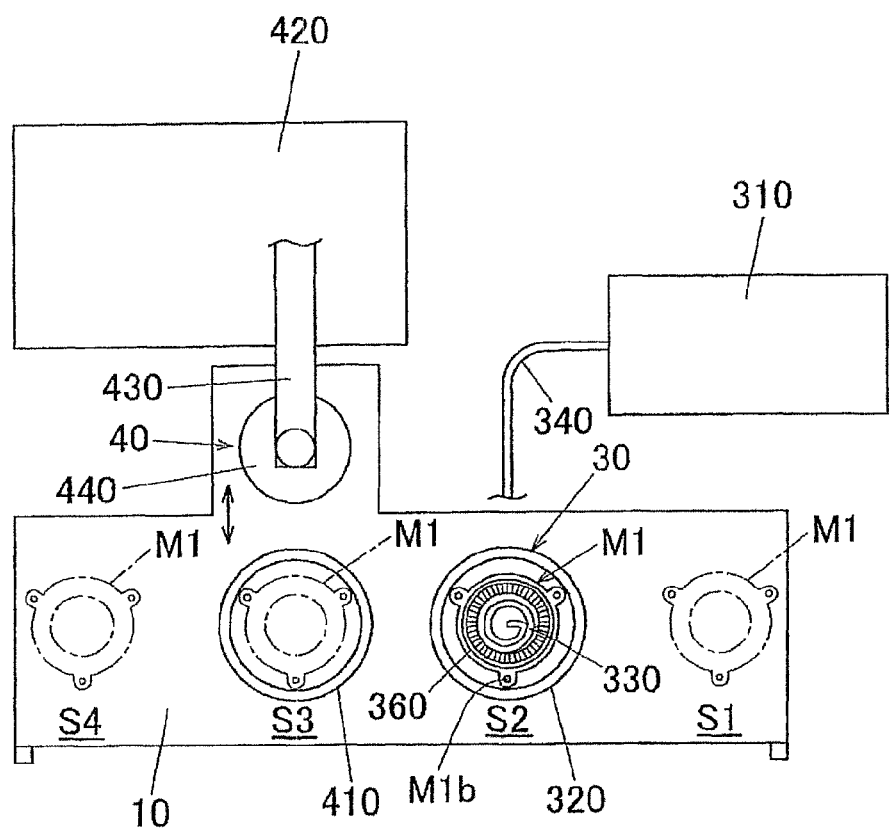
FIG. 7 This is an outline plain view showing a stator manufacturing system that includes the heating apparatus according to yet another embodiment of the present invention.
Figure 8:
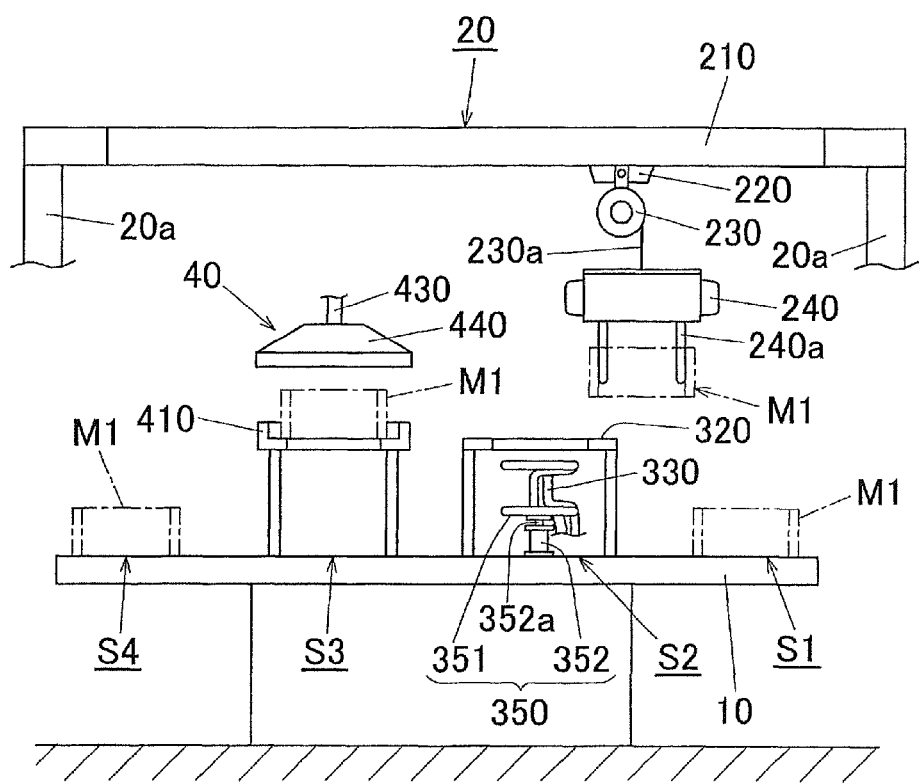
FIG. 8 This is an outline elevational view showing the same stator manufacturing system.

FIG. 7 and FIG. 8 are an outline plain view and an outline elevational view, respectively, showing a stator manufacturing system including a stator coil and core heating apparatus according to one embodiment of the present invention.

Figure 9:
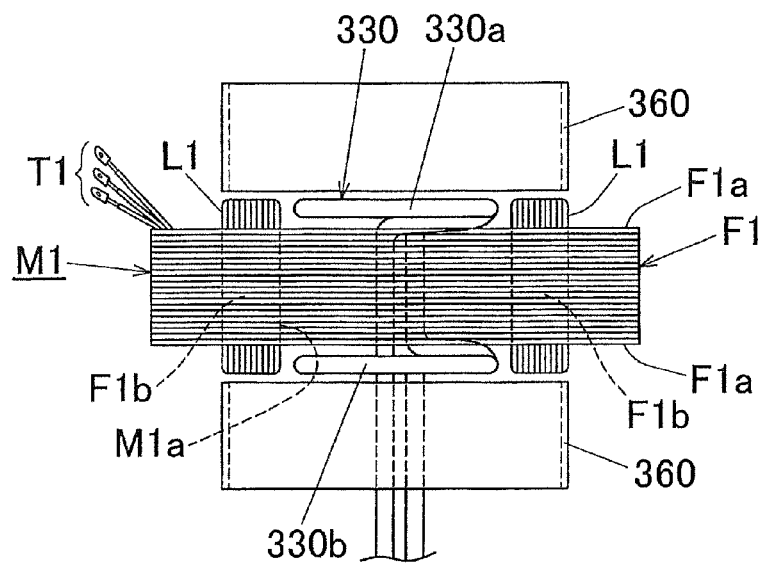
FIG. 9 This is an elevational view showing a high-frequency induction heating apparatus according to one embodiment of the present invention, to heat a stator coil and a core.
Figure 10:
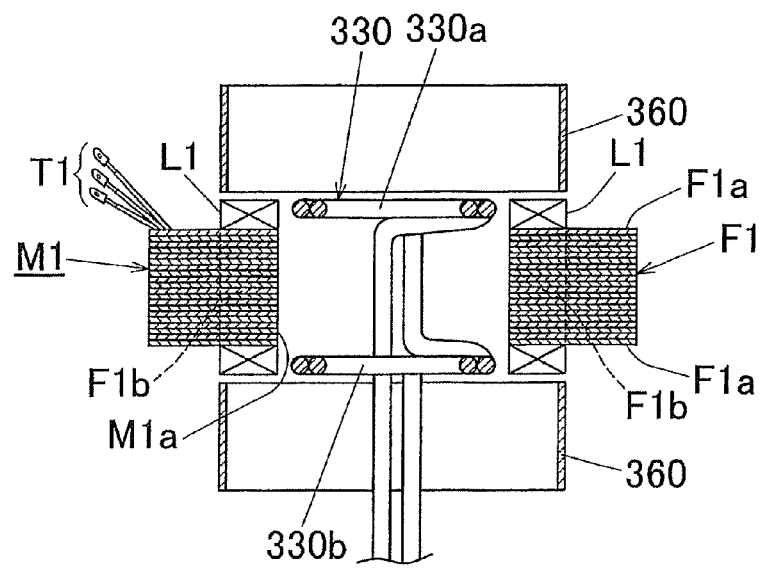
FIG. 10 This is a cutaway view showing the same high-frequency induction heating apparatus.

As shown in FIG. 7 and FIG. 8, a stator coil and core heating apparatus is used to heat a coil (stator coil) L1 of a stator M1 shown in FIG. 9 and FIG. 10, and a core F1, in the process of pre-heating before applying varnish W (FIG. 15) to the coil L1, and in the process of harden-heating after varnish application.

As shown in FIG. 9 and FIG. 10, the stator M1 has the stator coil L1 that is wound around an inner-circumferential protrusion F1b of the circular core F1 constructed of many steel plates layered in the thickness direction thereof, and a three-phase external terminal T1 is provided to the stator coil L1.

Mostly, this stator manufacturing system comprises a main workbench 10, a conveyance mechanism 20 to convey the stator M, a high-frequency induction heating apparatus 30 that applies high-frequency induction heat to the stator coil L1 of the stator M1 and the core F1 in a predetermined position, and a varnish application means 40 that applies varnish to the stator M1.

The main workbench 10 is a plate shaped in a rectangular that is long in the horizontal direction for example, and the top surface thereof has a receiving area S1, a heating area S2, a varnish application area S3 and a discharge area S4, specified from the right at predetermined intervals.

The conveyance mechanism 20 grasps the stator M1 from an upper area of the main workbench 10 and conveys it from the receiving area S1, through the areas S2 and S3, to the discharge area S4.

This conveyance mechanism 20 comprises a rail 210 that is supported by a pillar 20a and another pillar 20a for example and provided along the horizontal direction in an upper area of the main workbench 10, a trolley 230 supported by this rail 210 so as to be movable in the horizontal direction, and a chuck apparatus 240 strung out from the trolley 230 by a wire 230a so as to be movable up and down, and the stator M1 is grasped by a chuck 240a of the chuck apparatus 240.

As a matter of course, the conveyance mechanism 20 of the stator M1 is not limited to what uses the rail 210 and the trolley 230 above, and various conveyance mechanisms may be employed. Alternatively, a self-propelled robot may be employed.

The high-frequency induction heating apparatus 30 heats the stator coil L1, particularly, of the stator M1 and keeps it at a predetermined temperature, in advance of applying varnish to the stator coil L1 of the stator M1. And it comprises for example, a high-frequency oscillator 310, a receiving table 320 that receives the stator M1 conveyed to the heating area S2, a heating coil head 330 that is drawn from the high-frequency oscillator 310 via a cable 340, a coil head setting mechanism 350 that inserts and positions this coil head 330 in the stator M1, and a cylindrical shield 360.

This high-frequency induction heating apparatus 30 is capable of letting heating conditions such as a heating temperature, a heating time and etc. appropriate for a type of the stator M1, specified via an operation panel (not shown in Figure). The specified various heating conditions are recorded as a heating chart into a memory (not shown in Figure). Then, the appropriate heating chart for a type of the stator M1 that is a heating target is selected/specified via an operation panel or etc., thereby it is called out of the heating chart, and then the heating conditions to heat the stator M1 are executed according to the heating chart under computer control.

A plurality of supporting pins not shown in Figure stand on the top surface of the receiving table 320, and when the stator M1 is placed on the receiving table 320, the supporting pins are inserted into a plurality of fitting holes (not shown in Figure) cut in the stator M1, and thus the stator M1 is positioned.

As a matter of course, this receiving table 320 is not necessarily provided. Alternatively, the stator M1 may be received directly on the workbench 10.

As shown in FIG. 5, the heating coil head 330 has a two-stage structure constructed of a upper looped portion 330a and a lower looped portion 330b in the thickness direction (the vertical direction) of the core F1. And the upper looped portion 330a is for example a two-turn loop that is provided on one end face (the upper end face) of the core F1 in the thickness direction thereof, approximately at the upper end region of the stator coil L1, meanwhile the lower looped portion 330b is for example a two-turn loop that is provided on the other end face (the lower end face) of the core F1 in the thickness direction thereof, approximately at the lower end region of the stator coil L1.

As described above, providing the upper looped portion 330a on one end face of the core F1 in the thickness direction thereof in the vicinity of the upper end region of the stator coil L1, and the lower looped portion 330b on the other end face of the core F1 in the thickness direction thereof in the vicinity of the lower end region of the stator coil L1, is intended to let a high-frequency magnetic flux generated by the looped portions 330a and 330b act on and go trough the stator coil L1 of the stator M1, effectively from a near position.

The heating coil head 330 is not necessarily a two-stage one having the upper looped portion 330a and the lower looped portion 330b, and only needs to have at least one of the loops, 330a (330b). Furthermore, the number of turns of the looped portions 330a and 330b may be set to three, one or other plural number, depending on a preferable coil heating speed.

The coil head setting mechanism 350 has a coil head holding member 351 that holds the coil head 330 from the bottom, and a cylinder 352 that moves this coil head holding member 351 up and down. And its structure extends a piston rod 352a and lets it insert the coil head 330 into a central opening Mia of the stator M, when the stator M is placed on the receiving table 32.

The coil head setting mechanism 350 is not limited to the structure above, and an arbitrary structure that inserts the coil head 330 into the stator M1 from the top, for example, may be employed.

The cylindrical shield 360 is shaped in a circular cylinder in this embodiment. And in order to let an induction magnetic flux generated by the coil head 330 intensively go through the stator coil L1, it blocks out the magnetic flux trying to act on the outer circumference area F1a of the core F1 and directs it to the stator coil L1, and is positioned coaxially with the core F1, in the vicinity of the outer end of the stator coil L1 in the radial direction of the core F1 and outside on the upper and lower end faces of the stator coil L1 in the thickness direction of the core F1. From the point of view of letting a magnetic flux act on the stator coil L1 more effectively, the interval between the stator coil L1 and each of the cylindrical shields 360 is preferably specified within about 5 mm.

A constituent material of this shield 360 can be any metallic material, and it is preferably a less magnetoresistive metallic material, for example a Cu plate, etc. It is not limited to a plain plate, and punched metallic material, meshed material or etc. may be used.

Figure 12:
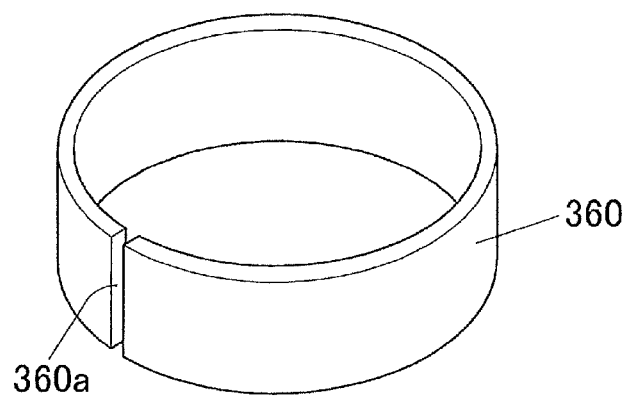
FIG. 12 This is a perspective view showing a cylindrical shield of the same high-frequency induction heating apparatus.

This cylindrical shield 360 may be cooled by a cooling apparatus not shown in Figure, in order to avoid being heated due to an electrical current passing circumferentially. Furthermore, in this example, as shown in FIG. 12, a slit 360a is made in a location in the circumferential direction of the cylindrical shield 360, and it blocks out an eddy current in the circumferential direction and thereby prevents the cylindrical shield 360 itself from being heated. Meanwhile, the slit 360a may be left out if a cooling apparatus is provided.

The varnish application means 50 applies varnish W (FIG. 15) to the stator coil L1 of the stator M that is conveyed to the varnish application area S3 after being heated with high-frequency induction heat, and it comprises for example, a receiving table 410 that receives the stator M1, a varnish provider 420 that is positioned behind the workbench 10, and a varnish application gun 440 that is connected by a varnish providing pipe 430 from the varnish provider 420 and applies the varnish W from an upper area of the stator M1.

As a matter of course, the receiving table 410 is not necessarily provided. Alternatively, the heated stator M1 may be received directly on the workbench 10.

Hereinafter, the method of manufacturing the stator M1 by the manufacturing system of the structure described above will be explained.

Figure 13:
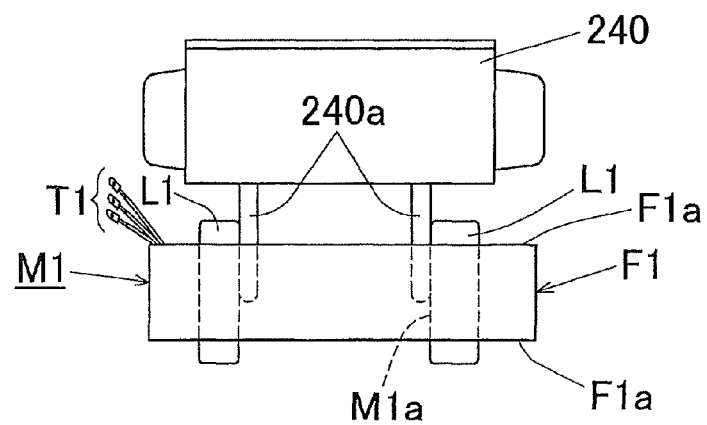
FIG. 13 (A) is a view to explain the state of conveying a stator by a chuck mechanism, and (B) is a view showing a stator conveyed to a heating area and set therein.
Figure 13:
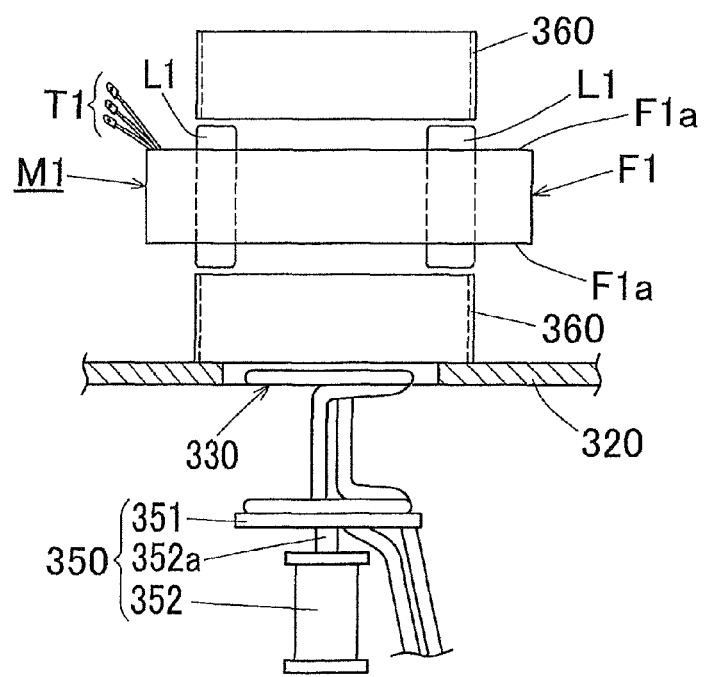

Initially, the stator M is conveyed to the receiving area S1 on the workbench 10 after a previous process. Then, as shown in FIG. 13 (A), the stator M1 is grasped by the chuck 240a of the chuck apparatus 240. And the stator M1 grasped by the chuck 240a is conveyed to the heating area S2 by trolley 230's leftward moving operation.

When the stator M1 arrives in the heating area S2, the stator M1 grasped by the chuck 240a is received on the receiving table 320 and positioned thereon, as shown in FIG. 13 (B).

In this state of things, the cylinder 351 of the coil head setting mechanism 350 is driven. Then, as shown in FIG. 4 (C), the piston rod 352a is extended, and thereby the coil head 330 is moved upward together with the coil head holding member 351, and inserted and set into the central opening M1a of the stator M1.

In this state of things, initially, the high-frequency oscillator 310 of the high-frequency induction heating apparatus 30 is driven. Then, a high-frequency output is given to the coil head 330, and a high-frequency induction effect acts on the stator coil L1 of the stator M1 due to a high-frequency magnetic flux generated by the coil head 330, and thereby the stator coil L1 is heated directly. In addition, the protrusion F1b of the inner circumference of the core F1 is heated due to a high-frequency induction effect, and thereby the stator coil L1 is heated through the core F1.

As for heating conditions, an appropriate heating chart for the stator M1 can be selected among various heating charts preliminarily recorded in a memory of the high-frequency induction heating apparatus 30, by using an operation panel or etc.

When the stator coil L1 of the stator M1 is heated at a predetermined temperature with high-frequency induction heat applied by the coil head 330, the high-frequency induction heat applied by the coil head 330 is stopped.

Subsequently, the piston rod 351 of the cylinder 352 is shortened, and thereby the coil head 330 is discharged from the central opening Mia of the stator M1.

Figure 14:
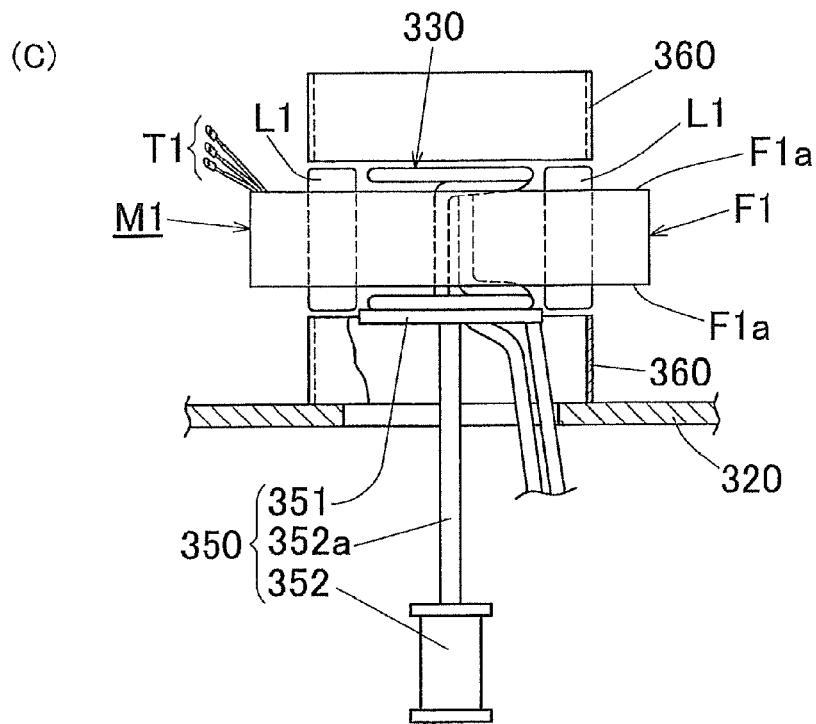
FIG. 14 (C) is a view showing a coil head that is a high-frequency induction heating means, set on a stator, and (D) is a view to explain the state of conveying a heated stator to a varnish application area.
Figure 14:
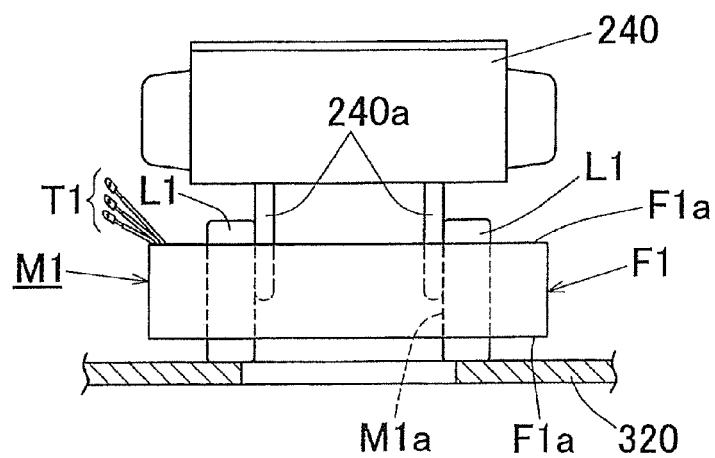

After that, as shown in FIG. 14 (D), the stator M1 is grasped by the chuck 240a of the chuck apparatus 240, conveyed to the varnish application area S3, then placed on the receiving table 410 and positioned thereon.

Figure 15:
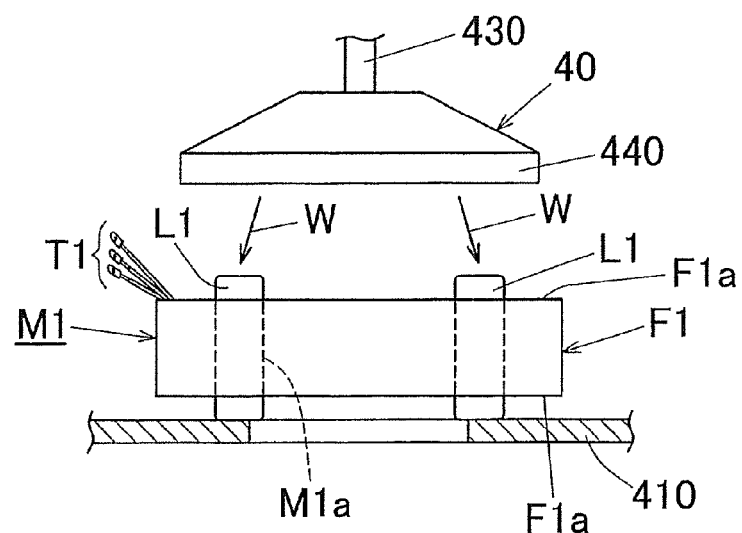
FIG. 15 This is a view to explain the state of applying varnish to a stator coil after heating.

When the varnish provider 420 is driven in this state of things, the varnish W is applied to the stator coil L1 of the stator M1 from the varnish application gun 40 that is positioned in an upper area of the stator M1, as shown in FIG. 15. Then, the stator coil L1 is impregnated with the varnish W.

As described above, in the process of varnish application, the stator M1 is inductively heated by the high-frequency induction heating coil head 330, and thereby the stator coil L1 is heated directly, and also heated through the core F1. Therefore, contrary to the case of using a heating furnace, it is not necessary to bother to insert the stator M1 in a heating furnace and discharge it therefrom. That would improve operating efficiency. As a matter of course, after the stator M1 is heated with high-frequency induction heat, the stator M1 may be inserted into a heating furnace in order to be heated uniformly and prevent from being cooled, and then varnish may be applied thereto.

By the way, when the stator M1 is inductively heated by the high-frequency induction heating coil head 330 without providing the cylindrical shield 360 and the other cylindrical shield 360, there is a risk that a large part of a high-frequency magnetic flux generated by the coil head 330 acts on the circumference, specifically the outer circumference area F1a of the core F1 in the thickness direction thereof, and thereby only this area is particularly heated.

To cope with this, in this embodiment, the cylindrical shield 360 and the other cylindrical shield 360 are provided outside on the upper and lower end faces of the stator coil L1 in the thickness direction of the core F1. Therefore, a blocking effect of the cylindrical shield 360 and the other cylindrical shield 360 acts against a high-frequency magnetic flux trying to act on the outer circumference area F1a of the core F1 from the coil head 330 and prevents it from acting on the outer circumference area F1a of the core F1, and thereby a large part of the high-frequency magnetic flux is directed to the stator coil L1. Thus, the outer circumference area F1a of the core F1 is not particularly heated, and the stator coil L1 is heated efficiently and rapidly.

Furthermore, the cylindrical shields 360 are positioned in the vicinity of the outer end of the stator coil L1 in the radial direction of the core F1, which could let the high-frequency magnetic flux go through the stator coil L1 more effectively.

Figure 16:
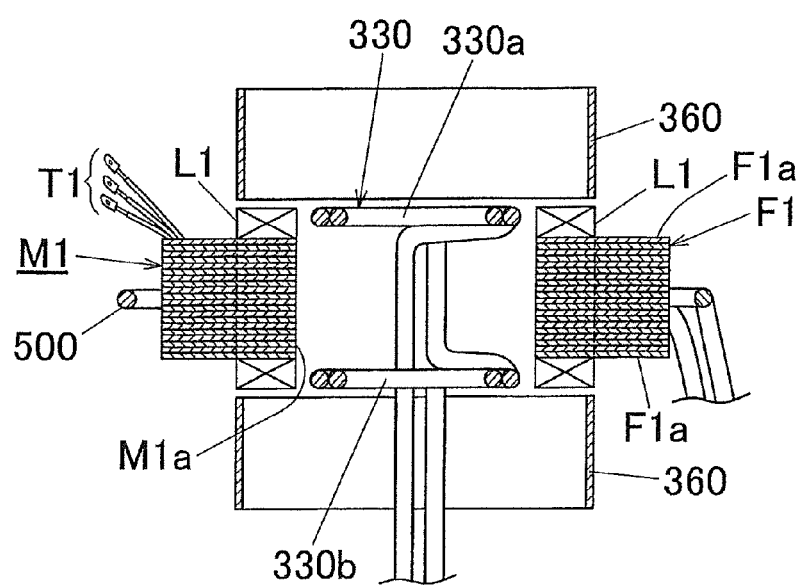
FIG. 16 This is an elevational cutaway view showing a high-frequency induction heating apparatus according to another embodiment of the present invention, to heat a stator coil and a core.

FIG. 16 shows yet another embodiment of the present invention.

In the embodiment shown in FIG. 16, an outside core heating coil head 500 of one-turn loop, for example, is provided approximately in the middle region of the stator M1 in the thickness direction thereof, circumferentially.

Providing this outside coil head 500, the core F1 is heated from outside with high-frequency induction heat, and through the core F1 which temperature is increased due to being heated in this way, the stator coil L1 is also heated, and thus the entire stator M1 is heated more efficiently. In comparison to the case of applying heat only by the coil head 330, a less heating time is required to heat the stator coil L1 and the core F1 at a predetermined temperature and less energy is required for heating, which would contribute to reduction of electrical energy.

For more efficient heat application, it is preferable that heat is initially applied by the inside coil head 330, and after that, heat is started to be applied by the outside heating head 500. The inside coil head 330 and the outside coil head 500 may be connected to the same high-frequency power source and heating timings and power may be adjusted thereby. Alternatively, those may be driven by different power sources.

Figure 11:
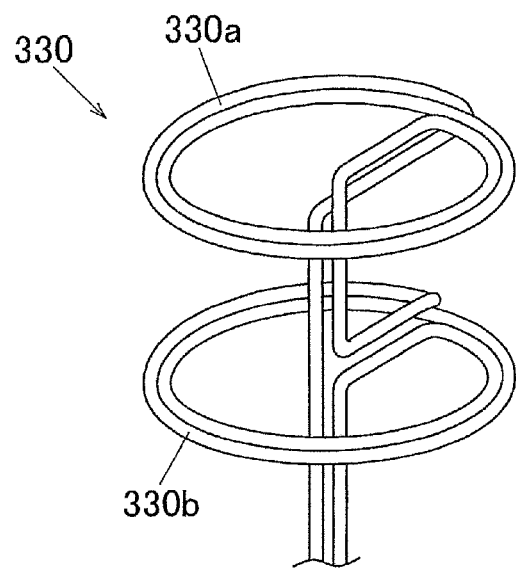
FIG. 11 This is a perspective view showing a coil head of the same high-frequency induction heating apparatus.

By the way, high-frequency induction heat is applied by using the coil head 330 shown in FIG. 11 under the same conditions excluding the shield 360: in the case of positioning the copper cylindrical shields 360 (outside diameter: 203 mm, height: 70 mm, thickness: 3 mm) shown in FIG. 12, coaxially with the core F1 of the stator coil, outside on the upper and lower end faces of the stator coil L1 in the thickness direction of the core F1 (the interval between the stator coil L1 and each of the cylindrical shields 360 is specified as 10 mm), with their circumferential surfaces adjusted at the same level as the external sides of the stator coil L1 in the radial direction of the core F1; and in the case of not positioning the shield 360. Electrical energy used therein is specified as 10 kw (180V, 56A) and a frequency is specified as 44.1 kHz.

As a result, in the case of not using the cylindrical shield 360, the speed of increasing a temperature of the outer circumference area F1a of the core F1 in the thickness direction thereof, was extremely higher than the speed of increasing a temperature of the stator coil L1, and thereby heat application could not be continued until a temperature of the stator coil L1 reaches a predetermined temperature. On the other hand, in the case of using the cylindrical shield 360, the speed of increasing a temperature of the stator coil L1 became higher, meanwhile the speed of increasing a temperature of the outer circumference area F1a of the core F1 in the thickness direction thereof became lower, and thereby heat application could be continued until a temperature of the stator coil L1 reaches a predetermined temperature.

Figure 17:
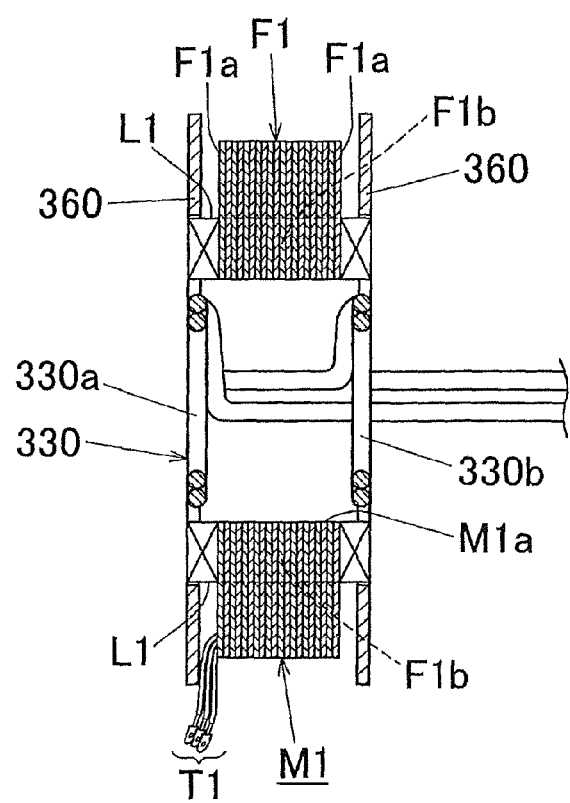
FIG. 17 This is an elevational cutaway view showing a high-frequency induction heating apparatus according to yet another embodiment of the present invention, to heat a stator coil and a core.

Meanwhile, in the embodiment explained above, the stator M1 is positioned with the thickness direction of the core F1 (the axial direction of the stator M1) adjusted to the vertical direction, and then heated. However, a position of the stator M1 is not limited to a specific one, and it may be positioned with the thickness direction of the core F1 (the axial direction of the stator M1) adjusted to the horizontal direction as shown in FIG. 17, and then heated.

Furthermore, the shield 360 is exemplified to be cylindrical. Alternatively, the shield 360 of a doughnut-like shape, which width exits in the radial direction, may be positioned outside of the stator coil L1 as shown in FIG. 17, or the shield of another shape may be positioned there. Briefly, any shape is applicable as long as it is capable of blocking a magnetic flux generated by the coil head 330, out of the outer circumference area of the core F1.

This application claims priority under Japanese Patent Application No. 2007-5205 filed on Jan. 12, 2007, the entire disclosure of which is incorporated herein by reference in its entirety.

The words and expressions employed herein are intended for explanation, and neither for expounding in a limited way nor for excluding any equivalent to the aspects, features and/or advantages illustrated and described herein. And those should be understood to include various modifications within the scope of the claimed invention.

What is claimed is:

1. A stator coil heating apparatus for heating a stator coil wound around an inner circumference of a circular core, the circular core extending along an axial direction, the stator coil heating apparatus comprising:
  a high-frequency induction heating portion configured to heat the stator coil and the circular core, the high-frequency induction heating portion including a high-frequency induction heating coil head configured to fit within a central opening of the circular core;

the high-frequency induction heating portion further comprising a shield positioned coaxially with the circular core, outside of the circular core, at each of the end faces of the circular core in the axial direction while the high-frequency induction heating coil head is within the central opening of the circular core; and the shield being configured to block a magnetic flux generated by the coil head, from an outer circumference area of the circular core in the axial direction while the high-frequency induction heating coil head is within the central opening of the circular core, wherein the shield is positionable separately from the stator coil and the circular core, the shield is cylindrical or donut-shaped with an opening in the center thereof large enough to allow the high-frequency induction heating coil head to pass therethrough, and the high-frequency induction heating portion is configured to directly heat the stator coil.

2. The stator coil heating apparatus recited in claim 1, wherein the shield is positioned in the vicinity of an outer end of the stator coil in a radial direction of the circular core.

3. The stator coil heating apparatus recited in claim 1, wherein the high-frequency induction heating coil head has a looped portion that is positioned in the vicinity of the stator coil, against one or both of the end faces of the circular core in the axial direction.

4. The stator coil heating apparatus recited in claim 1, wherein the high-frequency induction heating coil head is positioned in a middle region of the circular core in the axial direction, circumferentially around the circular core.

5. The stator coil heating apparatus recited in claim 1, wherein the shield comprises copper.

6. The stator coil heating apparatus recited in claim 1, wherein the shield includes a slit extending from the bottom of the shield to the top of the shield in the axial direction.

7. The stator coil heating apparatus recited in claim 1, wherein the high-frequency induction heating coil head has an upper looped portion and a lower looped portion, wherein the upper looped portion is configured to heat an upper end face of the circular core in the axial direction and the lower looped portion is configured to heat a lower end face of the circular core in the axial direction when the high-frequency induction heating coil head is within the circular core.

8. The stator coil heating apparatus recited in claim 7, wherein the shield is further comprised of an upper shield portion and a lower shield portion, the upper shield portion positioned coaxially with the circular core, outside of the circular core, at the upper end face of the circular core in the axial direction and configured to block magnetic flux from the upper looped portion of the high-frequency induction heating coil head from the outer circumference area of the circular core in the axial direction, and the lower shield portion positioned coaxially with the circular core, outside of the circular core, at the lower end face of the circular core in the axial direction and configured to block magnetic flux from the lower looped portion of the high-frequency induction heating coil head from the outer circumference area of the circular core in the axial direction.

9. A stator coil heating apparatus for heating a stator coil wound around an inner circumference of a circular core, the circular core extending along an axial direction, the stator coil heating apparatus comprising:

a high-frequency induction heating portion configured to heat the stator coil and the circular core by a high-frequency induction heating coil head provided in a central opening of the circular core;

a coil head setting mechanism for inserting and positioning the high-frequency induction heating coil head in the central opening of the circular core of the stator having the stator coil wound around the inner circumference of the circular core;

means for blocking a magnetic flux generated by the coil head from reaching an outer circumference area of the circular core in the axial direction while the high-frequency induction heating coil is positioned in the central opening of the circular core by the coil head setting mechanism, the coil head setting mechanism further configured to support the blocking means coaxially with the circular core, outside of the circular core, adjacent to and spaced from each of the end faces of the circular core in the axial direction while the high-frequency induction heating coil is within the central opening of the circular core; and the blocking means being configured of a material capable of blocking the magnetic flux generated by the coil head and having an opening in a center thereof large enough to allow the high-frequency induction heating coil head to pass therethrough, wherein the blocking means is cylindrical or donut-shaped, the blocking means is positionable separately from the stator coil and the circular core, and the high-frequency induction heating portion is configured to directly heat the stator coil.

10. The stator coil heating apparatus recited in claim 9, wherein the blocking means is positioned in the vicinity of an outer end of the stator coil in a radial direction of the circular core.

11. The stator coil heating apparatus recited in claim 9, wherein the high-frequency induction heating coil head has a looped portion that is positioned in the vicinity of the stator coil, against one or both of the end faces of the circular core in the axial direction.

12. The stator coil heating apparatus recited in claim 9, wherein the high-frequency induction heating coil head is positioned in a middle region of the circular core in the axial direction, circumferentially around the circular core.

* * * * *